United States Patent Office 3,505,084
Patented Apr. 7, 1970

3,505,084
METHOD OF PREPARING A COLLAGEN SAUSAGE CASING
Allan James Kidney, Ealing, London, England, assignor to Lever Brothers Company, New York, N.Y., a corporation of Maine
No Drawing. Filed June 13, 1966, Ser. No. 556,849
Claims priority, application Great Britain, June 14, 1965, 25,123/65
Int. Cl. B29c; A23b 1/00
U.S. Cl. 99—175                     4 Claims

ABSTRACT OF THE DISCLOSURE

Process of manufacturing collagenous products in which collagenous dough is shaped to form the product, the dough is subjected to a solution of collagen-precipitating setting salt, and the product is dried to a moisture content of 15–40% by weight in the presence of the salt.

---

This invention relates to the treatment of collagenous products.

Manufactured collagen products, for example fibres, sheet and casing, are commonly made by forming a suspension or paste containing collagen or a collagen derivative into a desired shape and then "setting" the collagen by contacting it with suitable chemicals, so that a more or less permanent form can be imparted to the product.

The present invention provides a method of treating formed collagenous products, in which a collagenous product is submitted to a drying treatment in the presence of a hydrophilic material.

Any suitable hydrophilic material may be used but it is usually convenient to employ a hydrophilic material which is capable of precipitating collagen. In general when the collagenous product is to be eaten, edible hydrophilic materials are preferred, since washing of the product need not be so complete as when non-edible hydrophilic materials are employed.

The hydrophilic material may be a salt or a polyhydric alcohol, for example sucrose or polyethylene glycol. The preferred hydrophilic material for use according to the invention is salt, most preferably sodium chloride.

Usually it is desirable to wash at least some of the hydrophilic material from the product after the drying treatment, after which a further drying step may be necessary.

The collagenous product may be dried in the presence of the hydrophilic material (the product generally being sufficiently strong to allow gentle manipulation), to a moisture content of 40% or less, preferably to below 30%. In a particularly preferred process, when precipitation was in saturated sodium chloride solution, the collagenous product was dried to 15% moisture, before being washed by spraying and redried to about 30% moisture. It is important however, that drying after precipitation is not continued to a moisture content at which the collagenous product is too brittle to handle conveniently; the addition of a small proportion of a plasticiser, for example glycerol, has been found to be of advantage.

When the collagenous product is formed by precipitation with a hydrophilic material, it may be convenient to dry the product to a moisture content within the above mentioned limits in the presence of that hydrophilic material. Alternatively the hydrophilic material used to precipitate the collagenous product may be removed or partially removed by transferring the product to a second hydrophilic material, the product then being dried or partially dried in the presence of that second hydrophilic material.

The invention is applicable to the production of collagenous products derived from substantially any collagen source. Thus casings and other collagenous products, for example filaments, fibres, bands and sheets may be treated according to the invention.

Before formation into the desired shape the collagenous material may have been treated with any or all of the following chemicals: acid, alkali and proteolytic enzymes.

We have found that collagenous products made according to the present invention are in general stronger than those from which the precipitating hydrophilic material is washed before drying.

The invention has particular application to the production of manufactured sausage casings made by the extrusion of collagen or collagen derivatives into a precipitating bath. In the production of edible casings, sodium chloride in concentrated solution, has been employed very successfully as the precipitating agent in accordance with the invention. (Below about 5% solids it may be found that other salts, for example ammonium sulphate, are more suitable as precipitating agents, but use of such substances is not so desirable since they usually need to be thoroughly washed from the casing, and their presence in a food product may be contrary to food laws. Sodium chloride need not be washed completely from the casing, and contravenes no food laws.)

Examples illustrating the invention are described below.

EXAMPLE 1

This example describes the manufacture of sausage casings from acid-swollen collagenous material.

5 kg. of limed splits from cattle hide were immersed in 20 litres of water containing 200 p.p.m. of free chlorine for an hour at room temperature. The splits were then transferred to 20 litres of a 10% solution of sodium chloride to which HCl was then added to pH 3.0. When the centre of a cut piece of split was acid to phenolphthalein, the acid washing was complete and the splits were washed in water until the centre of the split showed a neutral reaction.

The splits were then soaked in 20 litres of a saturated solution of sodium sulphate at 20° C. for 24 hours. Sodium hydroxide was then added to make the salt solution molar with respect to sodium hydroxide, that is 4%, and the splits were gently agitated in this bath for a further 24 hours at 20° C.

The treated splits were washed with water, then dilute HCl was added, but the pH was not allowed to fall below 3.0. The splits were again washed in water until the centre of a cut piece was neutral. The splits were then comminuted by passing them through a high speed mincer fitted with a plate having holes about 8 mm. diameter. Water was passed through the machine with the splits to reduce the temperature and to obtain a comminuted mass containing 10% to 11% of solids. The minced modified collagen was then comminuted by three passes through a colloid mill to give a paste having a smooth fibrous consistency.

The modified collagen suspension was then thoroughly mixed in a planetary dough mixer while water and lactic acid were added to obtain a solids concentration of 7% and to reduce the pH to 3.0. The dough so obtained was deaerated by mixing under vacuum in a Z-blade mixer for 20 minutes.

The air-free dough, having a viscosity of about 50 poise, was fed to a contra-rotating extrusion nozzle having an annular aperture of 0.5 mm. The indicated extrusion pressure employed for a dough containing 6% collagen was 8 kg./sq. cm., when extruded at 4 meters per minute. The formed casing was extruded upwards into saturated sodium chloride solution, the tube being inflated with air;

saturated sodium chloride was circulated in the interior of the tube.

The inflated casing, while still wet with saturated salt solution, was dried in hot air until the moisture content was below 30%, when it was washed with water to remove the salt, redried in hot air and allowed to equilibrate in an atmosphere at 80% relative humidity for 24 hours.

EXAMPLE 2

This example describes an alternative method for manufacturing sausage casings from acid-swollen collagenous material.

30 kg. of fresh limed split trimmings were gently agitated in a vat containing 150 l. of saturated sodium sulphate solution for 18 hours. The temperature of the vat was maintained throughout the process at 20° C. and a small excess of sodium sulphate was added to ensure saturation. Sufficient sodium hydroxide was added to give a concentration of 1 N and this alkali treatment was continued for 24 hours.

The treated hides were washed in running water for 30 minutes and then agitated with dilute hydrochloric acid at pH 4 until the hides were essentially neutral. 10% of sodium chloride calculated on the wet weight of hides was added to the hydrochloric acid solution to prevent swelling of the hides. All traces of acid and salt were then removed by washing in water.

The treated hides were minced twice through an 8 mm. plate, water or ice being added in order to keep the temperature below 25° C. and to give the desired solids content of 10% to 11%. The minced hides were passed three times through a colloid mill to produce a smooth, fibrous paste.

The fibrous paste was mixed vigorously with water and lactic acid to give a viscous mass at pH 3 containing 7.0% solids. This was deaerated by mixing in a Z-blade mixer for 20 minutes at a pressure of 3 cm. mercury.

The deaerated material was extruded through a contra-rotating nozzle into a setting bath consisting of saturated sodium chloride made $N/10$ with ammonium hydroxide. The casing was dried in a stream of warm air and the salt was removed by spraying with $N/10$ ammonium hydroxide solution. The washed casing was dried in warm air to a moisture content of 30%.

EXAMPLE 3

This example describes the manufacture of sausage casings from acid-swollen collagenous material which had not been pretreated with alkali.

Fresh cow hides, which had not been treated with alkaline or enzymic agents, were washed in cold water at 10° C. in a rotating drum for 18 hours. After washing, the hides were defleshed and the hair and epidermis removed.

The resulting hide was then cut into pieces about 5 cm. square and pulped in a meat grinder, the final pulping being through holes 1.5 mm. in diameter. The temperature of the hide was kept below 20° C. during this operation by the addition of ice.

The pulp was diluted with cold water to a smooth paste (having 7.5% dry solids) to which was then added an equal volume of 2.4% aqueous lactic acid. The resulting mixture was homogenized thoroughly, so that in the resulting paste a large proportion of the collagen was present as swollen fibrils, from which unswollen non-collagenous and collagenous matter were removed by filtration.

The resulting smooth paste was extruded in the form of a tube 1.5 cm. in diameter, through a contra-rotating nozzle upwards into a bath of saturated sodium chloride about 25 cm. deep, saturated sodium chloride solution also being circulated in the interior of the tube, and the formed casing, after leaving the solution, being inflated with air.

The inflated tubing, while still wet with the precipitating fluid, was dried in air at about 60° C. to a moisture content of 15%, after which it was washed by spraying it with $N/10$ ammonium hydroxide solution to remove much of the salt, redried in hot air and allowed to equilibrate in an atmosphere at 80% relative humidity for 24 hours.

EXAMPLE 4

This example describes the manufacture of a collagenous sheet material from acid-swollen collagen.

Air-free collagenous dough was prepared according to the method described in Example 1. The dough was then fed to a contra-rotating nozzle having an annular aperture, part of which was blocked off. A formed sheet was extruded upwards into saturated sodium chloride solution and then, while still wet with saturated salt solution, the sheet was dried in hot air to a moisture content of less than 30%. The collagenous sheet was finally washed to remove the salt, redried in hot air and allowed to equilibrate in an atmosphere at 80% relative humidity for 24 hours.

What is claimed is:

1. A method of preparing a collegen sausage casing consisting of the steps of: (1) shaping a collagen dough containing collagen fibers to form a casing, (2) applying a solution of a collagen-precipitating setting salt to the casing under conditions whereby the casing takes up a quantity of the salt, (3) and drying the product in a gaseous drying medium in the presence of the salt thus taken up until a moisture content in the range of 15–40% by weight is reached.

2. A method according to claim 1, wherein the salt is sodium chloride.

3. A method according to claim 1, wherein the salt is ammonium sulphate.

4. A method according to claim 1, in which at least part of the salt taken up is washed from the product after the drying step and the washed product is redried to a moisture content of about 30%.

References Cited

UNITED STATES PATENTS

| 2,785,075 | 3/1957 | Malecki. | |
| 2,988,451 | 6/1961 | Zahn | 99—176 |
| 3,034,852 | 5/1962 | Nishihara. | |
| 3,123,653 | 3/1964 | Lieberman. | |
| 3,235,641 | 2/1966 | McKnight. | |
| 3,373,046 | 3/1968 | Fagan | 99—176 X |
| 3,408,916 | 11/1968 | Cohly et al. | 99—176 |

HYMAN LORD, Primary Examiner